G. R. OSBORN & B. A. DRAYTON.
BIRD-CAGE HOOK.
No. 7,133. Reissued May 23. 1876.
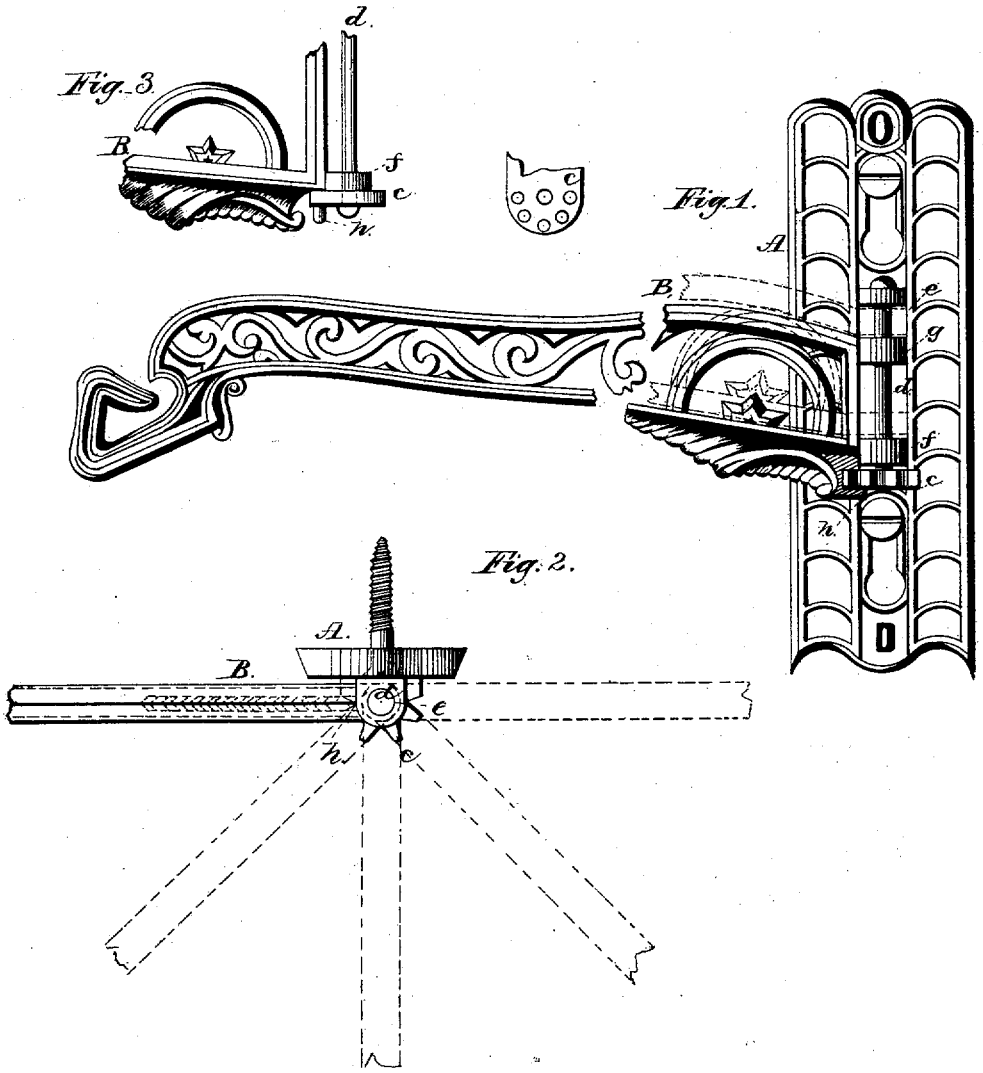
Witnesses:
Harry W. Lawrence
E. J. B. Gunning
Inventors:
George R. Osborn
Benj. A. Drayton
N. PETERS, PHOTO-LITHOGRAPHER, WASHINGTON, D. C.

UNITED STATES PATENT OFFICE.

GEORGE R. OSBORN, OF EAST ORANGE, NEW JERSEY, AND BENJAMIN A. DRAYTON, OF NEW YORK, N. Y.

IMPROVEMENT IN BIRD-CAGE HOOKS.

Specification forming part of Letters Patent No. 169,571, dated November 2, 1875; reissue No. 7,133, dated May 23, 1876; application filed January 29, 1876.

DIVISION A.

*To all whom it may concern:*

Be it known that we, GEORGE R. OSBORN, of East Orange, county of Essex, and State of New Jersey, and BENJAMIN A. DRAYTON, of the city, county, and State of New York, have invented certain new and useful Improvements in Hooks for Hanging Bird-Cages, which improvement is fully set forth in the following specification and accompanying drawings, forming a part of the same, in which—

Figure 1 is a front elevation of the plate and arm, the arm being moved to the extreme left to show the several parts. Fig. 2 is a plan view of the same, and Fig. 3 a modification.

Similar letters refer to corresponding parts of the several figures.

Our invention relates to swinging brackets in which the arm is pivoted to a plate capable of being secured to a wall or window-casing, or any upright surface; and it consists in devices for adjusting and holding the horizontally-swinging arm at any desired position.

Heretofore there has been no plan in use for retaining the horizontally-swinging arm at any desired position, and it is found in practice that as the hinge or pivot wears the arm moves too freely, and, consequently, if the plate is not secured to the wall in an exact vertical position, the arm gravitates to one side. Our invention overcomes this objection in a simple and effective manner.

In the drawing, A is a plate, provided with elongated holes for the screws and projecting lugs *c* and *e*, perforated and forming a portion of the hinge. The projection *c* is provided with notches or perforations for the reception of the tenon *h* on the swinging arm. The arm B is provided at its inner end with circular perforated lugs *f* and *g*, through which the pivot-pin *d* passes.

The space between the plate-lugs *c* and *e* is greater than the extremes of the arm-lugs *f* and *g*. This allows the arm to be raised upon the pin or bolt *d* high enough to clear the projection or tenon *h* from the notches or perforations in lug *c*, when it can be turned to the right or left and dropped into any desired notch.

We do not confine ourselves to any desired number of notches or perforations in the lug *c*.

The outer end of the swinging bracket is provided with a suitable hook.

Having fully described our invention, what we claim, and desire to secure by Letters Patent, is—

1. A swinging suspending-arm for hanging bird-cages, &c., provided with suitable devices for engaging with a notched portion of a removable plate or fixture, so that said arm may be retained in various horizontal positions, for the purpose specified.

2. The bracket or plate A, provided with the notched or perforated lug *c*, in combination with the arm B, having a hook and tenon, *h*.

3. The plate A, having lug *e*, notched or perforated lug *c*, and bolt or pin *d*, in combination with the arm B, having lugs *f g* and tenon *h*, said lugs being relatively arranged so as to allow of a vertical movement of said arm upon the bolt *d*, for the purpose set forth.

GEORGE R. OSBORN.
BENJ. A. DRAYTON.

Witnesses:
HARRY W. LAWRENCE,
E. J. B. GUNNING.